(12) United States Patent
Irie (10) Patent No.: US 9,884,651 B2
(45) Date of Patent: Feb. 6, 2018

(54) VEHICLE SIDE PORTION STRUCTURE

(71) Applicant: TOYOTA JIDOSHA KABUSHIKI KAISHA, Toyota-shi, Aichi (JP)

(72) Inventor: Kyohei Irie, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/101,123

(22) PCT Filed: Dec. 11, 2014

(86) PCT No.: PCT/JP2014/083503
§ 371 (c)(1),
(2) Date: Jun. 2, 2016

(87) PCT Pub. No.: WO2015/098673
PCT Pub. Date: Jul. 2, 2015

(65) Prior Publication Data
US 2016/0355214 A1   Dec. 8, 2016

(30) Foreign Application Priority Data
Dec. 24, 2013 (JP) .................................. 2013-265965

(51) Int. Cl.
*B62D 25/04* (2006.01)
*B62D 25/02* (2006.01)
*B62D 21/15* (2006.01)

(52) U.S. Cl.
CPC ........... *B62D 25/04* (2013.01); *B62D 21/157* (2013.01); *B62D 25/025* (2013.01)

(58) Field of Classification Search
CPC ..... B62D 25/04; B62D 25/025; B62D 21/157
USPC ...................................... 296/193.06
See application file for complete search history.

(56) References Cited

U.S. PATENT DOCUMENTS

| 8,491,046 B2* | 7/2013 | Nagai .................... B62D 25/02 296/146.6 |
| 2006/0208537 A1 | 9/2006 | Dingman et al. |
| 2014/0232138 A1 | 8/2014 | Kanaguichi et al. |

FOREIGN PATENT DOCUMENTS

| JP | 2009-101794 A | 5/2009 |
| JP | 2010-173403 A | 8/2010 |
| WO | 2013/077200 A1 | 5/2013 |

* cited by examiner

*Primary Examiner* — Joseph D. Pape
*Assistant Examiner* — Dana D Ivey
(74) *Attorney, Agent, or Firm* — Oliff PLC (57) ABSTRACT

A vehicle side portion structure is provided that can suppress or prevent separation at a joined portion between members at a time of a vehicle side collision. At a pillar outer reinforcement, a reinforcement upper and a reinforcement lower are joined at a joined portion by spot welding or the like. A hinge reinforcement is, in a state of spanning over this joined portion, joined to the reinforcement upper and the reinforcement lower. Therefore, when tensile force is applied to the pillar outer reinforcement, shearing force that acts on the joined portion can be reduced by reaction force obtained from the hinge reinforcement. Due thereto, at a time of a vehicle side collision, separation at the joined portion can be suppressed or prevented.

4 Claims, 6 Drawing Sheets

VEHICLE SIDE PORTION STRUCTURE

TECHNICAL FIELD

The present invention relates to a vehicle side portion structure.

BACKGROUND ART

There is disclosed a technique of providing a pillar reinforcement (outer reinforcement), that is divided in two vertically, within a center pillar that is structured to include a pillar outer panel and a pillar inner panel, in the vehicle side portion structure disclosed in Japanese Patent Application Laid-Open (JP-A) No. 2010-173403. In addition, there is disclosed a technique of providing a hinge reinforcement at the inner side of an outer reinforcement, in the pillar structure disclosed in JP-A No. 2009-101794.

SUMMARY OF INVENTION

Technical Problem

By the way, in a case of dividing an outer reinforcement in two, the connected portion (joined portion) is joined by spot welding. In this case, at the time of a side collision of the vehicle (hereinafter referred to as "at the time of a vehicle side collision"), when a large load is inputted to the center pillar, shearing force acts on this connected portion, and there is the possibility of separation occurring.

In consideration of the above-described circumstances, an object of the present invention is to provide a vehicle side portion structure in which, at the time of a vehicle side collision, separation at a joined portion between members can be suppressed or prevented.

Solution to Problem

A vehicle side portion structure relating to a first aspect of the present invention is structured to include: a pillar outer panel that is disposed at a vehicle transverse direction outer side at a pillar that extends along a vehicle vertical direction; a pillar outer reinforcement that is disposed at a vehicle transverse direction inner side of the pillar outer panel, and that is divided along the vehicle vertical direction, and at which is provided a joined portion at which divisional members are joined so as to be superposed one on another; and a reinforcing member that is disposed at a vehicle transverse direction inner side of the pillar outer reinforcement, and that is joined to the pillar outer reinforcement so as to span over the joined portion.

In the vehicle side portion structure relating to the first aspect of the present invention, a pillar is structured to include a pillar outer panel, a pillar outer reinforcement, and a reinforcing member. The pillar outer panel is disposed at the vehicle transverse direction outer side. The pillar outer reinforcement is disposed at the vehicle transverse direction inner side of this pillar outer panel. This pillar outer reinforcement is divided along the vehicle vertical direction. A joined portion, at which the divisional members are joined so as to be superposed one on the other, is provided at the pillar outer reinforcement.

Further, the reinforcing member is disposed at the vehicle transverse direction inner side of the pillar outer reinforcement. The position of a lower edge portion in the vehicle vertical direction of this reinforcing member is set to be at the vehicle vertical direction upper side of a rocker. Generally, at the time of a vehicle side collision, when impact load is inputted to the pillar, the impact energy is absorbed by the pillar bending toward the vehicle transverse direction inner side. Therefore, the deformation mode of the pillar is ensured such that the deformation of the pillar is not impeded by the reinforcing member.

Here, in the present invention, the reinforcing member is joined to the pillar outer reinforcement so as to span over the joined portion of the pillar outer reinforcement. For example, at a joined portion at which plural panel members are joined (are joined by welding or are joined by fastening or the like), problems such as separation and the like arise when shearing force is applied to the panel members. Therefore, the strength is lower than a case in which the pillar outer reinforcement is formed by a single panel member. However, in the present invention, the reinforcing member is joined to the pillar outer reinforcement in a state of spanning over this joined portion. Therefore, when tensile force is applied to the pillar outer reinforcement, the shearing force that is applied to the joined portion can be reduced by the reaction force that is obtained from the reinforcing member.

In a vehicle side portion structure relating to a second aspect of the present invention, in the vehicle side portion structure relating to the first aspect, a position of a lower edge portion in the vehicle vertical direction of the reinforcing member is set so as to be at a vehicle vertical direction upper side of a rocker that extends along a vehicle longitudinal direction at a vehicle transverse direction outer side of a vehicle lower portion.

In the vehicle side portion structure relating to the second aspect of the present invention, by setting the position of the lower edge portion in the vehicle vertical direction of the reinforcing member to be at the vehicle vertical direction upper side of the rocker, it can be made such that, when the pillar bends toward the vehicle transverse direction inner side at the time of a vehicle side collision, the deformation of the pillar is not impeded by the reinforcing member.

In a vehicle side portion structure relating to a third aspect of the present invention, in the vehicle side portion structure relating to the first or second aspect, the joined portion is provided between an upper hinge mounting portion and a lower hinge mounting portion that are provided at the pillar outer panel and are for supporting a side door, that is provided at a vehicle side portion, such that the side door can open and close.

In the vehicle side portion structure relating to the third aspect of the present invention, by providing the joined portion between the upper hinge mounting portion and the lower hinge mounting portion of the pillar outer panel, the joined portion is reinforced by the reinforcing member at the vehicle transverse direction inner side; and reinforcing is effected by the side door at the vehicle transverse direction outer side.

A vehicle side portion structure relating to a fourth aspect of the present invention has, in the vehicle side portion structure relating to the third aspect, at the pillar outer panel, a weak portion that is formed at a lower side of the lower hinge mounting portion and is set to have lower rigidity than other portions of the pillar outer panel, wherein the lower edge portion of the reinforcing member is set so as to be further toward a vehicle vertical direction upper side than the weak portion.

In the vehicle side portion structure relating to the fourth aspect of the present invention, the weak portion, that is set to have lower rigidity than other portions of the pillar outer panel, is formed at the lower side of the lower hinge mounting portion at the pillar outer panel. Namely, the weak portion is set such that impact energy is absorbed due to the pillar deforming with this weak portion being the starting point at the time of a vehicle side collision. Therefore, by setting the lower edge portion of the reinforcing member to be further toward the vehicle vertical direction upper side than this weak portion, it is made such that deformation of the pillar is not impeded at the time of a vehicle side collision.

In a vehicle side portion structure relating to a fifth aspect of the present invention, in the vehicle side portion structure relating to any of the first through fourth aspects, a cut-out or a hole portion is formed in the reinforcing member, further toward a vehicle vertical direction lower side than a position facing the joined portion.

In the vehicle side portion structure relating to the fifth aspect of the present invention, a cut-out or a hole portion is formed in the reinforcing member further toward the vehicle vertical direction lower side than the position facing the joined portion. Therefore, at the portion where this cut-out or hole portion is formed, the strength and rigidity are lower than those at other portions of the reinforcing member. Due thereto, at the reinforcing member, the position that faces the joined portion bears the strength and rigidity for reinforcing the joined portion, and the strength and rigidity at the vehicle vertical direction lower side of the position that faces the joined portion are decreased, and the reinforcing member does not impede deformation of the pillar at the time of a vehicle side collision.

Advantageous Effects of Invention

The vehicle side portion structure relating to the first aspect of the present invention has the excellent effect that, at the time of a vehicle side collision, separation at the joined portion between members can be suppressed or prevented.

The vehicle side portion structure relating to the second aspect of the present invention has the excellent effect that the deformation mode of the pillar can be ensured.

The vehicle side portion structure relating to the third aspect of the present invention has the excellent effect that the joined portion between members is reinforced doubly by the reinforcing member and by the side door that includes the upper and lower door hinges.

The vehicle side portion structure relating to the fourth aspect of the present invention has the excellent effect that, at the time of a vehicle side collision, the pillar can be deformed at a predetermined position.

The vehicle side portion structure relating to the fifth aspect of the present invention has the excellent effect that contradictory performances at the pillar can be obtained by the reinforcing member.

DESCRIPTION OF EMBODIMENTS

A vehicle side portion structure relating to an embodiment of the present invention is described by using the drawings. Note that the vehicle longitudinal direction front side is indicated by arrow FR, the vehicle transverse direction outer side is indicated by arrow OUT, and the vehicle vertical direction upper side is indicated by arrow UP. Further, in the following description, when longitudinal and vertical directions are used, they mean the longitudinal of the vehicle longitudinal direction and the vertical of the vehicle vertical direction unless otherwise indicated.

(Structure of Vehicle Side Portion Structure)

Figure 6:
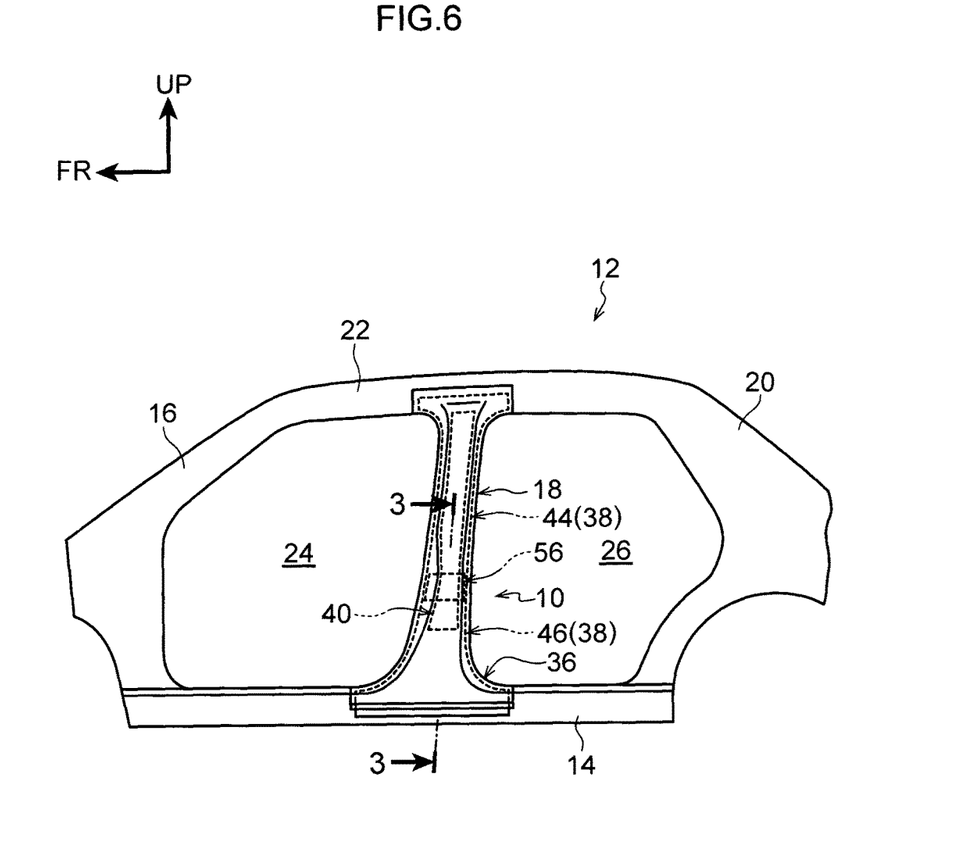
FIG. 6 is a schematic side view showing a vehicle to which the vehicle side portion structure relating to the present embodiment is applied.

As shown in FIG. 6, a rocker 14 extends along the vehicle longitudinal direction at the lower portion of a vehicle side portion at a vehicle (vehicle body) 12 to which a vehicle side portion structure 10 relating to the present embodiment is applied. A front pillar 16 extends upward form the front end portion of this rocker 14. Further, a center pillar 18 extends upward from the vehicle longitudinal direction central portion of the rocker 14. Moreover, a rear pillar 20 extends upward from the rear end of the rocker 14. A roof side rail 22, that extends along the vehicle longitudinal direction, is joined respectively to the upper end portion of the front pillar 16, the upper end portion of the center pillar 18, and the upper end portion of the rear pillar 20.

Further, a front side door opening portion 24, that is substantially rectangular as seen in a vehicle side view, is formed by the rocker 14, the front pillar 16, the roof side rail 22 and the center pillar 18. Further, a rear side door opening portion 26, that is substantially rectangular as seen in a vehicle side view, is formed by the rocker 14, the center pillar 18, the roof side rail 22 and the rear pillar 20.

Figure 2:
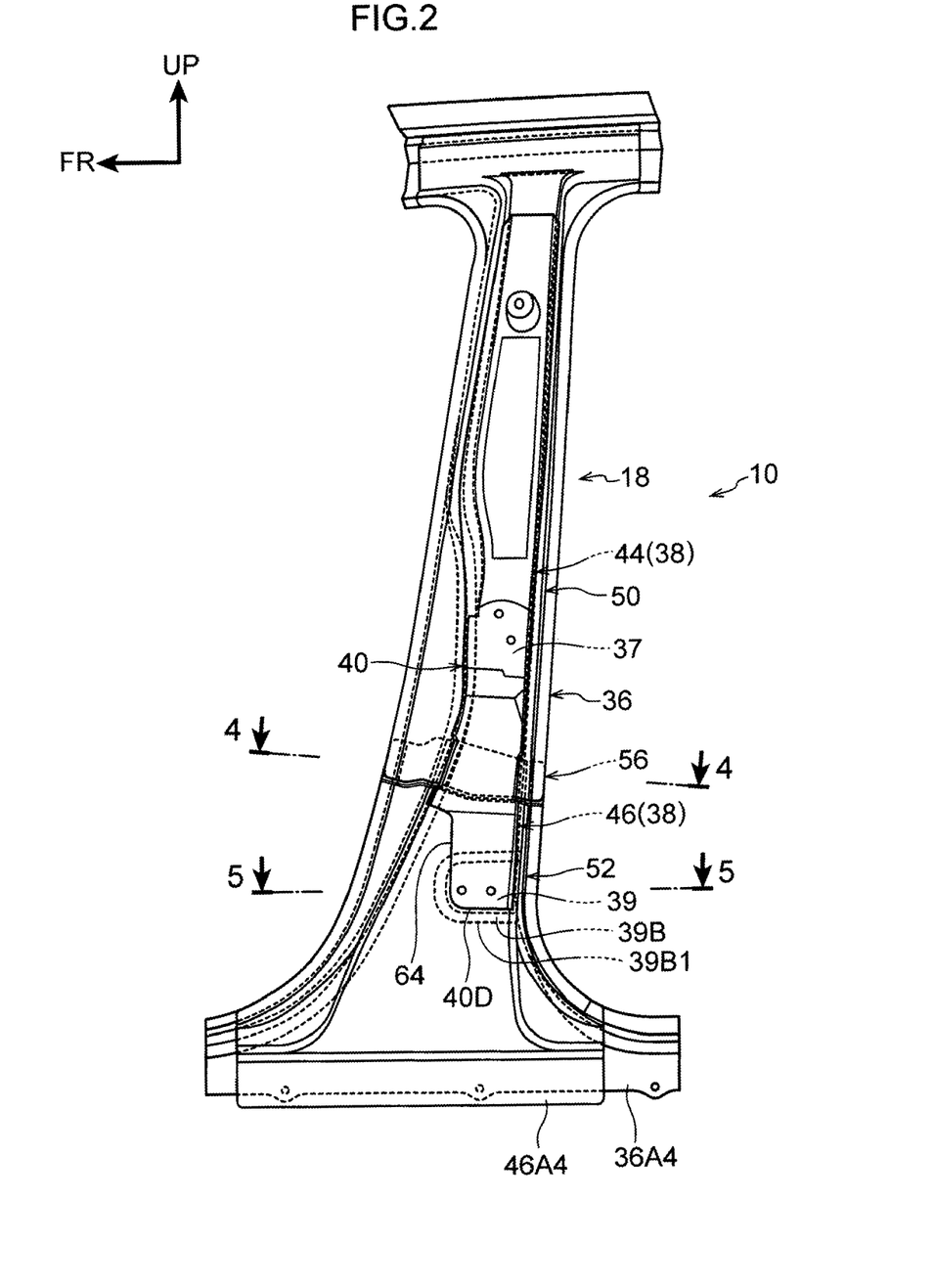
FIG. 2 is a schematic front view in which the center pillar, to which the vehicle side portion structure relating to the present embodiment is applied, is viewed from a vehicle cabin inner side.
Figure 4:
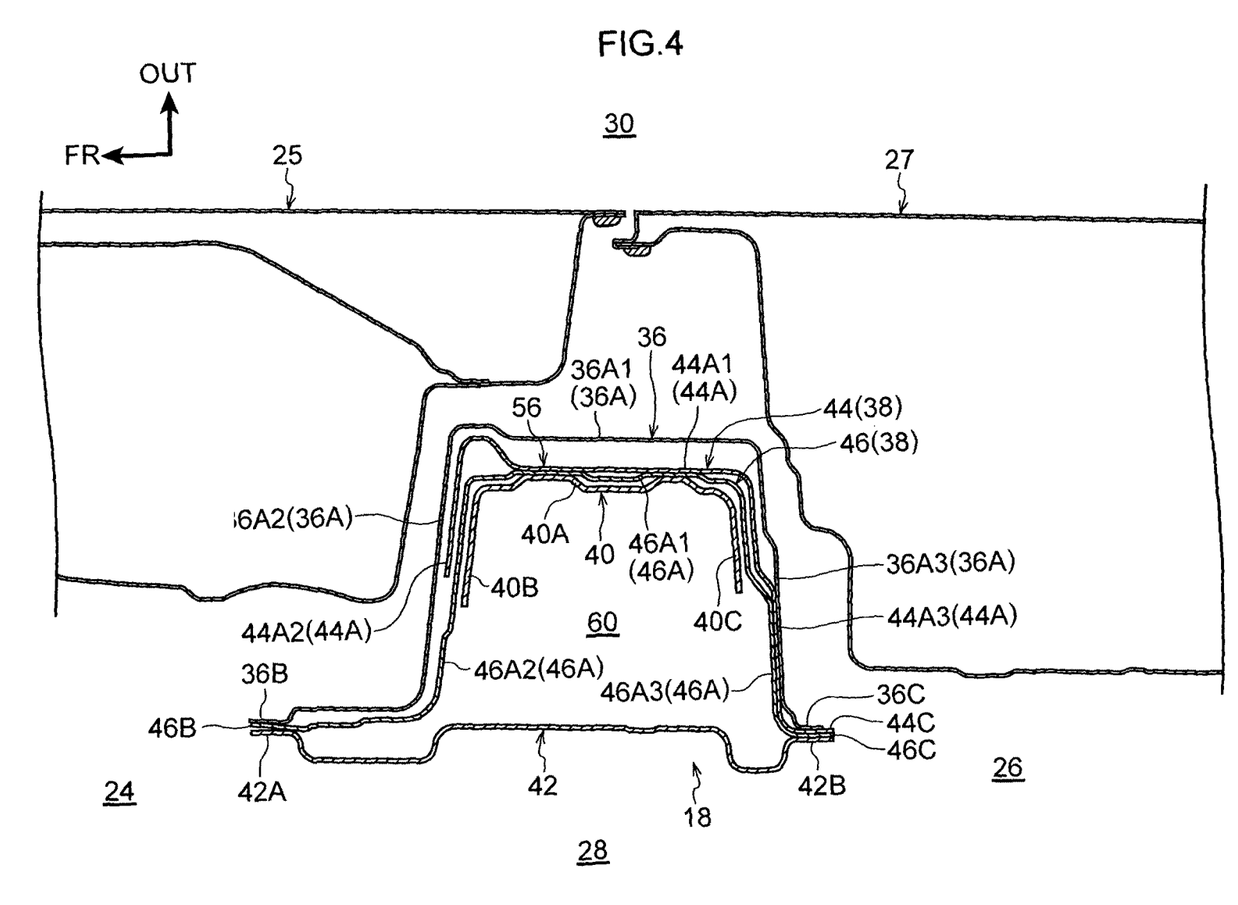
FIG. 4 is a schematic sectional view cut along line 4-4 of FIG. 2.

A cabin 28 and a vehicle exterior 30 side are partitioned so as to be able to be opened and closed, due to the front side door opening portion 24 and the rear side door opening portion 26 being closed by a front side door 25 and a rear side door 27, respectively, as shown in FIG. 4. Note that a cross-sectional view cut along line 4-4 of FIG. 2 is shown in FIG. 4.

Figure 3:
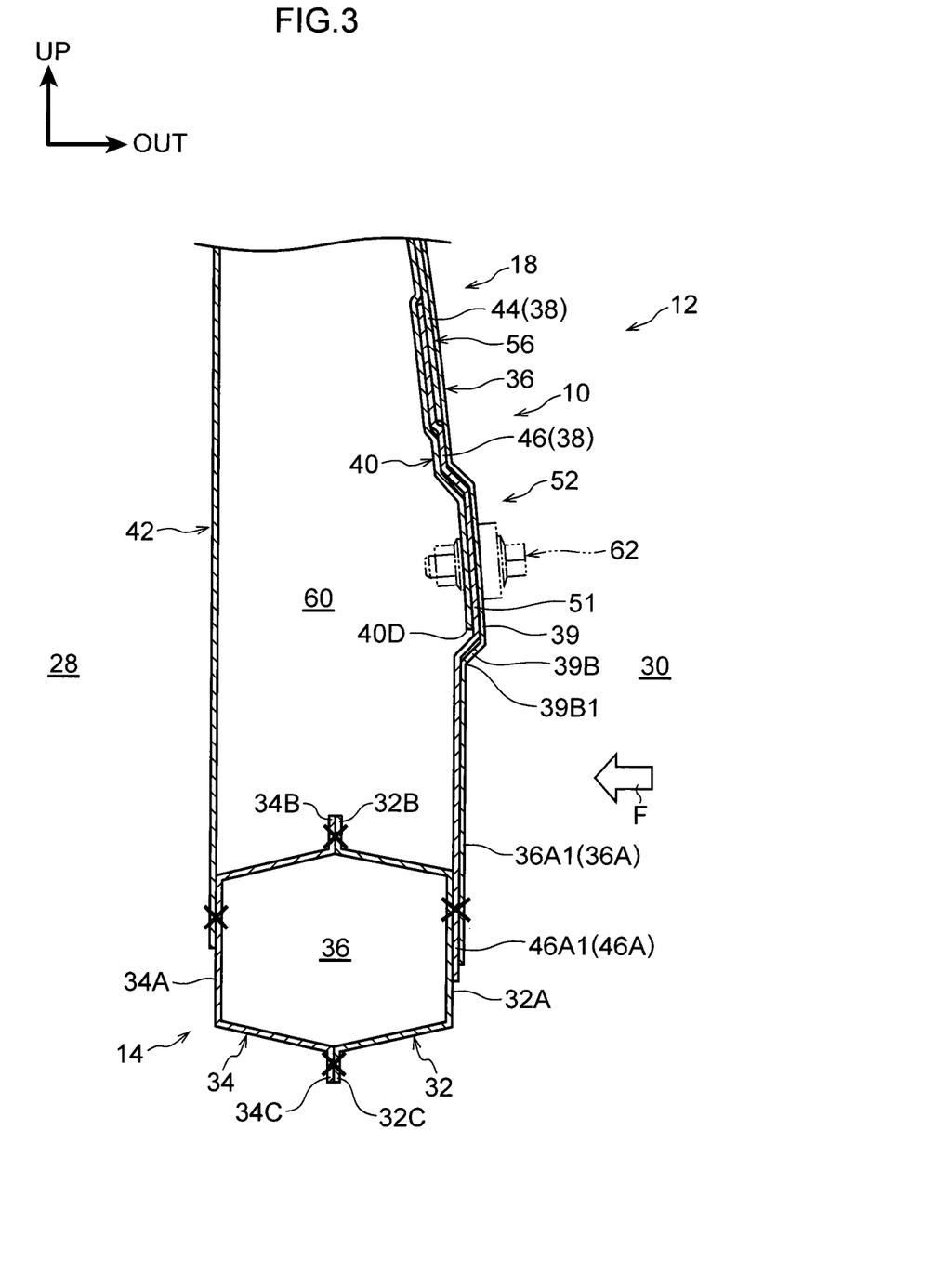
FIG. 3 is a schematic sectional view cut along line 3-3 of FIG. 6.

Here, a cross-sectional view cut along line 3-3 of FIG. 6 is shown in FIG. 3. As shown in FIG. 3, the rocker 14 is structured to include a rocker outer panel 32 that is disposed at the vehicle transverse direction outer side, and a rocker inner panel 34 that is disposed at the vehicle transverse direction inner side.

The rocker outer panel 32 is formed by a steel plate, and the cross-sectional shape thereof that is cut along the vehicle transverse direction is formed in a hat shape that opens toward the vehicle transverse direction inner side. At this rocker outer panel 32, an upper flange portion 32B extends upward from the upper end portion of a base wall portion 32A that is a so-called general portion. Further, a lower flange portion 32C extends downward from the lower end portion of the base wall portion 32A.

Further, the rocker inner panel 34 is formed by a steel plate, and the cross-sectional shape thereof that is cut along the vehicle transverse direction is formed in a hat shape that opens toward the vehicle transverse direction outer side. At this rocker inner panel 34, an upper flange portion 34B extends upward from the upper end portion of a base wall portion 34A that is a so-called general portion. Further, a lower flange portion 34C extends downward from the lower end portion of the base wall portion 34A.

The upper flange portion 32B of the rocker outer panel 32 and the upper flange portion 34B of the rocker inner panel 34 can be joined together. Further, the lower flange portion 32C of the rocker outer panel 32 and the lower flange portion 34C of the rocker inner panel 34 can be joined together. Moreover, due to the rocker outer panel 32 and the rocker inner panel 34 being joined, a closed cross-section portion 36 that is hexagonal is formed between the rocker outer panel 32 and the rocker inner panel 34. Note that "joining" in the present embodiment means joining by welding by spot welding or laser welding or the like, unless otherwise indicated.

Figure 1:
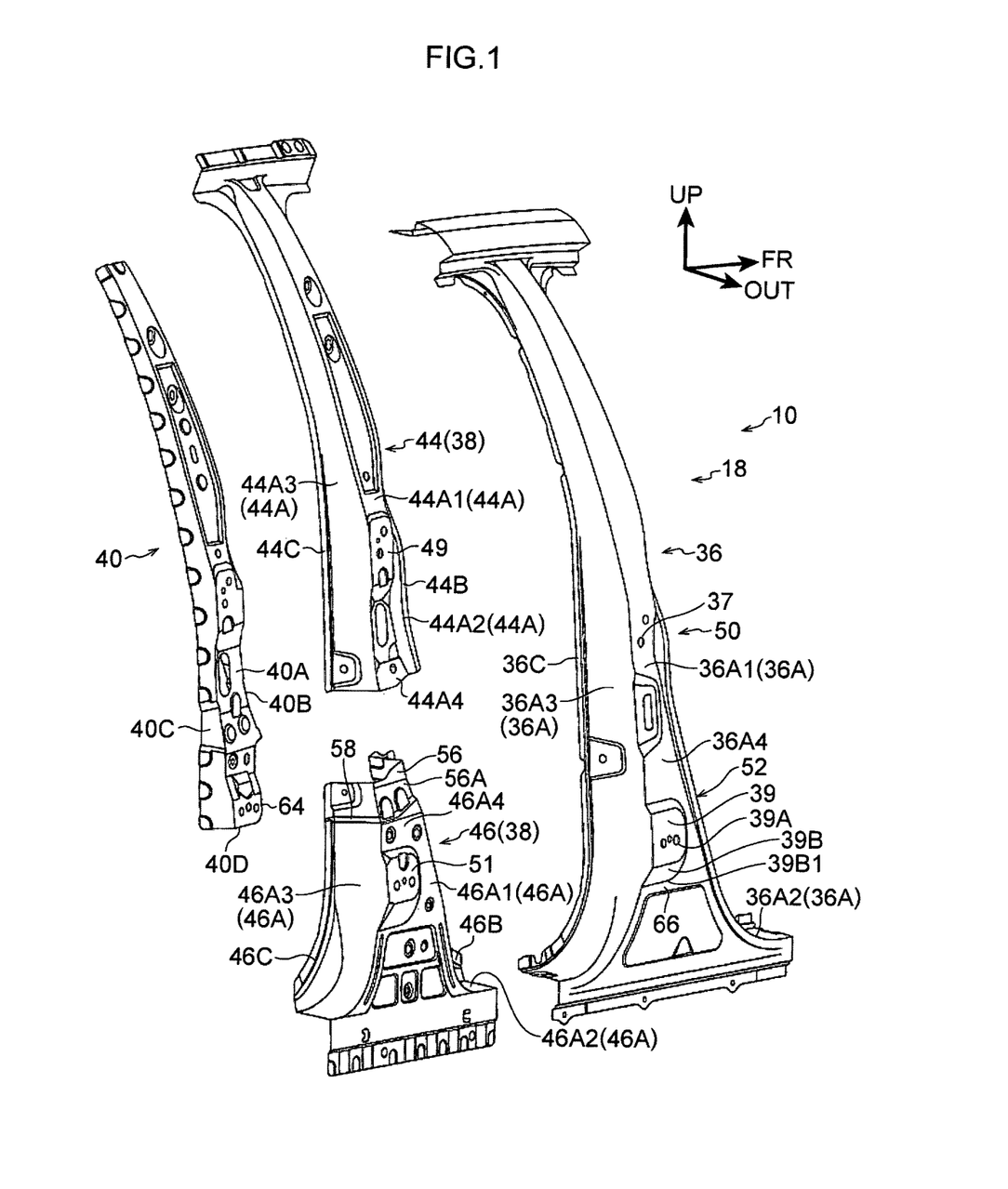
FIG. 1 is an exploded perspective view showing the structure of a center pillar to which a vehicle side portion structure relating to the present embodiment is applied.

On the other hand, an exploded perspective view of the center pillar 18 is shown in FIG. 1. At the center pillar 18, a pillar outer panel 36, a pillar outer reinforcement 38, a hinge reinforcement 40 that serves as a reinforcing member, and a pillar inner panel 42 (see FIG. 3) are disposed in that order from the vehicle transverse direction outer side.

The pillar outer panel 36 is formed from a steel plate, and as shown in FIG. 4, the cross-sectional shape thereof that is cut along a substantially horizontal direction is formed in a hat shape that opens toward the vehicle transverse direction inner side. At this pillar outer panel 36, a base wall portion 36A, that extends along the vehicle vertical direction and is a so-called general portion, is structure to include a vertical wall portion 36A1 that is disposed along the vehicle longitudinal direction, a front wall portion 36A2 that is bent toward the vehicle transverse direction inner side at the front portion of the vertical wall portion 36A1, and a rear wall portion 36A3 that is bent toward the vehicle transverse direction inner side at the rear portion of the vertical wall portion 36A1.

Further, a front flange portion 36B extends toward the front from the inner end portion at the vehicle transverse direction inner side (hereinafter called inner end portion) of the front wall portion 36A2. A rear flange portion 36C extends toward the rear from the inner end portion of the rear wall portion 36A3.

Figure 5:
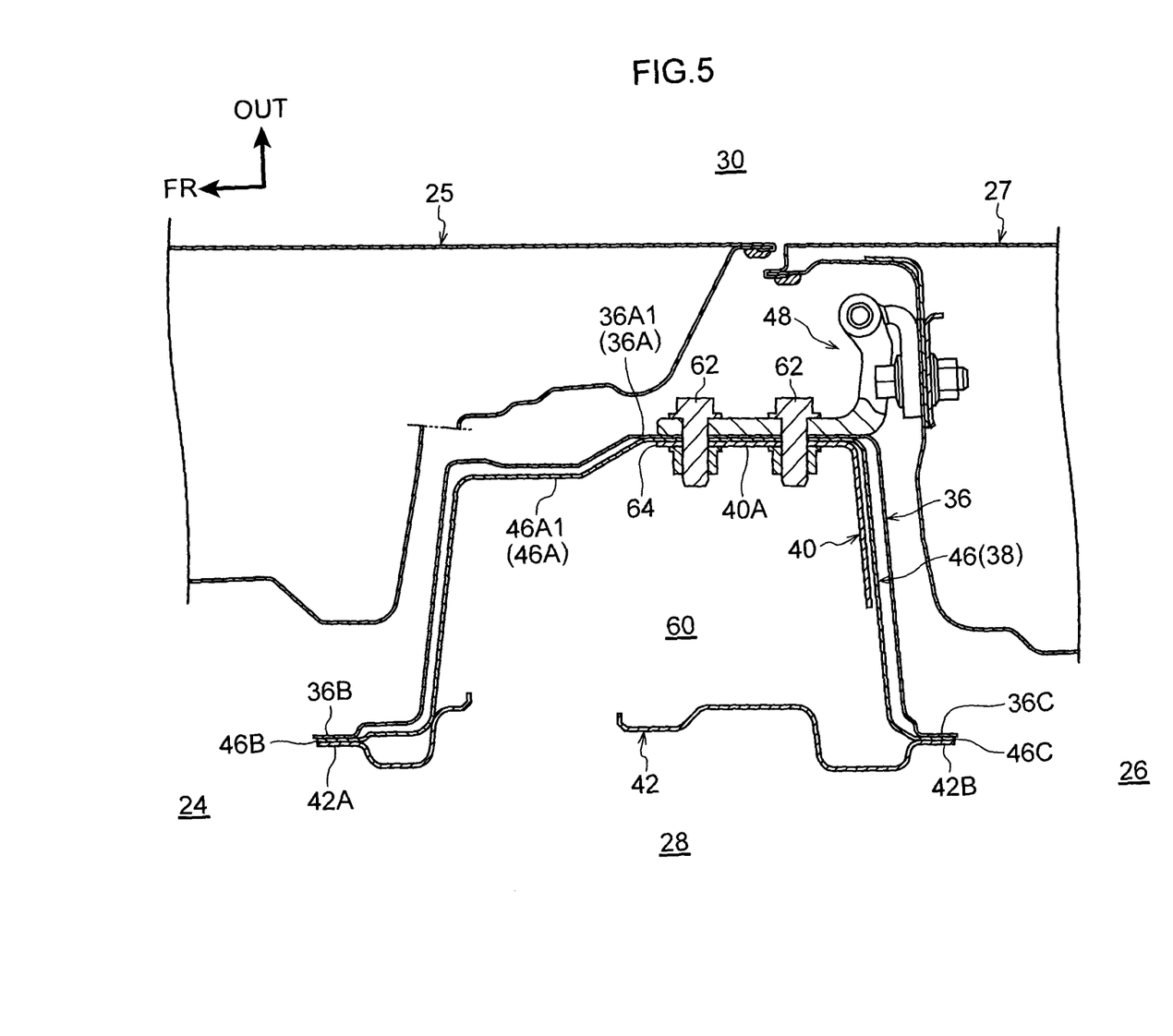
FIG. 5 is a schematic sectional view cut along line 5-5 of FIG. 2.

Note that, as shown in FIG. 1, an upper hinge mounting seat 37 (upper hinge mounting portion 50), to which is mounted an upper hinge (not illustrated) for opening and closing the side door 27 (see FIG. 5), and a lower hinge mounting seat 39 (lower hinge mounting portion 52), to which a lower hinge 48 (see FIG. 5) is mounted, are provided at the vertical wall portion 36A1. Note that a cross-sectional view cut along line 5-5 of FIG. 2 is shown in FIG. 5. Further, as shown in FIG. 3, the lower end side of the vertical wall portion 36A1 of the pillar outer panel 36 can face the base wall portion 32A of the rocker outer panel 32.

The pillar outer reinforcement 38 is joined to the inner side of the pillar outer panel 36. As shown in FIG. 1, this pillar outer reinforcement 38 is divided in two along the vehicle vertical direction, and is structured to include a reinforcement upper 44 that is disposed at the upper portion side, and a reinforcement lower 46 that is disposed at the lower portion side. The reinforcement upper 44 and the reinforcement lower 46 are respectively formed of steel plates of the same plate thickness.

At the reinforcement upper 44, a base wall upper portion 44A that is a so-called general portion is structured to include a vertical wall upper portion 44A1 that is disposed along the vehicle longitudinal direction, a front wall upper portion 44A2 that is bent toward the vehicle transverse direction inner side at the front portion of the vertical wall upper portion 44A1, and a rear wall upper portion 44A3 that is bent toward the vehicle transverse direction inner side at the rear portion of the vertical wall upper portion 44A1.

Further, a front flange upper portion 44B extends toward the front from the inner end portion of the front wall upper portion 44A2, and a rear flange upper portion 44C extends toward the rear from the inner end portion of the rear wall upper portion 44A3. Note that an upper hinge mounting seat 49, to which the upper hinge (not shown) is mounted, is provided at the vertical wall upper portion 44A1 so as to face the upper hinge mounting seat 37 provided at the vertical wall portion 36A1 of the pillar outer panel 36.

On the other hand, at the reinforcement lower 46, a base wall lower portion 46A that is a so-called general portion is structured to include a vertical wall lower portion 46A1 that is disposed along the vehicle longitudinal direction, a front wall lower portion 46A2 that is bent toward the vehicle transverse direction inner side at the front portion of the vertical wall lower portion 46A1, and a rear wall lower portion 46A3 that is bent toward the vehicle transverse direction inner side at the rear portion of the vertical wall lower portion 46A1.

Further, a front flange lower portion 46B extends toward the front from the inner end portion of the front wall lower portion 46A2, and a rear flange lower portion 46C extends toward the rear from the inner end portion of the rear wall lower portion 46A3. Note that a lower hinge mounting seat 51, to which the lower hinge 48 (see FIG. 5) is mounted, is provided at the vertical wall lower portion 46A1 so as to face the lower hinge mounting seat 39 provided at the vertical wall portion 36A1 of the pillar outer panel 36. Further, as shown in FIG. 3, the lower end side of the vertical wall lower portion 46A1 of the reinforcement lower 46 can face the base wall portion 32A of the rocker outer panel 32, and is, together with the lower end side of the vertical wall portion 36A1 of the pillar outer panel 36, joined to the base wall portion 32A of the rocker outer panel 32.

Here, as shown in FIG. 1, a joined portion 56 is provided at the upper end portion of the reinforcement lower 46, so as to be positioned above the lower hinge mounting seat 51. The lower end portion of the reinforcement upper 44 can be joined to this joined portion 56. Because the upper hinge mounting seat 49 is provided at the reinforcement upper 44, this joined portion 56 is disposed between the upper hinge mounting portion 50 and the lower hinge mounting portion 52.

The joined portion 56 is formed to be smaller than the external shape of the base wall lower portion 46A, and is formed at a position that is set-in, further toward the inner side and by an amount corresponding to the plate thickness of the base wall upper portion 44A, than a surface 46A4 of the base wall lower portion 46A. Therefore, a step portion 58 is provided between a surface 56A of the joined portion 56 and the surface 46A4 of the base wall lower portion 46A at the reinforcement lower 46. Accordingly, in the state in which the lower end portion of the reinforcement upper 44 is joined to the joined portion 56 of the reinforcement lower 46, a surface 44A4 of the base wall upper portion 44A of the reinforcement upper 44 and the surface 46A4 of the base wall lower portion 46A of the reinforcement lower 46 are in a substantially flush state.

As described above, the hinge reinforcement 40 is disposed at the inner side of the pillar outer reinforcement 38, and the pillar inner panel 42 is disposed at the inner side of the hinge reinforcement 40. Therefore, if the members are described in order from the member disposed at the vehicle outer side, the hinge reinforcement 40 should be described next. However, the hinge reinforcement 40 will be described after the pillar inner panel 42 (see FIG. 4) is described.

As shown in FIG. 4, the pillar inner panel 42 is formed by press-working a steel plate material, and extends along the vehicle vertical direction and the vehicle longitudinal direction. The front flange upper portion 44B (see FIG. 1) and the rear flange upper portion 44C of the reinforcement upper 44 are joined respectively to a front end portion 42A and a rear end portion 42B in the vehicle longitudinal direction of the upper portion side of the pillar inner panel 42. Further, the front flange lower portion 46B and the rear flange lower portion 46C of the reinforcement lower 46 are joined respectively to the front end portion 42A and the rear end portion 42B in the vehicle longitudinal direction of the lower portion side of the pillar inner panel 42. Due thereto, a closed cross-section portion 60 is formed at the center pillar 18.

Note that, at the joined portion 56 of the pillar outer reinforcement 38, the front flange upper portion 44B (see FIG. 1) and the rear flange upper portion 44C of the reinforcement upper 44, and the front flange lower portion 46B and the rear flange lower portion 46C of the reinforcement lower 46, are respectively joined to the front end portion 42A and the rear end portion 42B of the pillar inner panel 42.

By the way, as shown in FIG. 5, the hinge reinforcement 40 is joined by bolts 62 to the inner side of the pillar outer reinforcement 38. These bolts 62 are the bolts 62 at the time of mounting the lower hinge 48, and the hinge outer panel 36, the reinforcement lower 46 and the hinge reinforcement 40 are fastened together by these bolts 62.

The hinge reinforcement 40 is formed of a steel plate, and, as shown in FIG. 4, the cross-sectional shape thereof that is cut along a substantially horizontal direction is formed in a substantial U-shape that opens toward the vehicle transverse direction inner side. The hinge reinforcement 40 is structured to include a vertical wall portion 40A that is disposed along the vehicle longitudinal direction, a front wall portion 40B that is bent toward the vehicle transverse direction inner side at the front portion of the vertical wall portion 40A, and a rear wall portion 40C that is bent toward the vehicle transverse direction inner side at the rear portion of the vertical wall portion 40A.

Further, as shown in FIG. 2 and FIG. 3, the hinge reinforcement 40 spans over the joined portion 56 at which the reinforcement upper 44 and the reinforcement lower 46 are joined. The upper end portion of the hinge reinforcement 40 is joined to the reinforcement upper 44, and the lower end portion of the hinge reinforcement 40 is joined to the reinforcement lower 46.

Further, as shown in FIG. 3, a lower edge portion 40D of the hinge reinforcement 40 is set so as to be upward of the rocker 14. For example, the lower edge portion 40D of the hinge reinforcement 40 is set so as to be at a position that is to a lower edge portion 39B1 of the lower hinge mounting seat 39 of the pillar outer panel 36. Further, a cut-out 64, that is formed by cutting-back the lower side, is formed in the lower end portion of the hinge reinforcement 40 from the front wall portion 40B to a portion (front portion) of the vertical wall portion 40A.

(Operation/Effects of Vehicle Side Portion Structure)

As shown in FIG. 1, in the present embodiment, the pillar outer reinforcement 38 is structured to include the reinforcement upper 44 and the reinforcement lower 46 that are divided in two vertically.

By dividing the pillar outer reinforcement 38 in two in this way, the molds for forming the pillar outer reinforcement 38 can be made to be small, the mass produceability can be improved, and costs accompanying the mold production can be reduced. Further, by forming the pillar outer reinforcement 38 by two members, a more complex shape can be formed than in a case in which the pillar outer reinforcement is formed by a single member, and the degrees of freedom in design increase.

Further, in the present embodiment, at the pillar outer reinforcement 38, the reinforcement upper 44 and the reinforcement lower 46 are joined at the joined portion 56 by spot welding or the like. Further, the hinge reinforcement 40 is joined to the reinforcement upper 44 and the reinforcement lower 46 in a state of spanning over this joined portion 56.

Although not illustrated, generally, at a joined portion at which plural panel members are joined (are joined by welding or are joined by fastening or the like), problems such as separation and the like arise when shearing force is applied to the panel members. Therefore, the strength is lower than a case in which the pillar outer reinforcement is formed by a single panel member. However, in the present embodiment, as shown in FIG. 3, the hinge reinforcement 40 is joined to the pillar outer reinforcement 38 in a state of spanning over the joined portion 56 of the pillar outer reinforcement 38.

Therefore, when tensile force is applied to the pillar outer reinforcement 38, the shearing force that is applied to the joined portion 56 can be reduced by the reaction force that is obtained from the hinge reinforcement 40. Due thereto, at the time of a side collision of the vehicle (hereinafter referred to as "at the time of a vehicle side collision"), separation at the joined portion 56 can be suppressed or prevented.

Further, in the present embodiment, the hinge reinforcement 40 is disposed at the vehicle transverse direction inner side of the pillar outer reinforcement 38, and the lower edge portion 40D of this hinge reinforcement 40 is disposed at the vehicle vertical direction upper side of the rocker 14.

Generally, at the time of a side collision of the vehicle 12, when collision load F is inputted to the center pillar 18, the impact energy is absorbed due to the center pillar 18 bending toward the vehicle transverse direction inner side. Therefore, the deformation mode of the center pillar 18 is ensured such that deformation of the center pillar 18 is not impeded by the hinge reinforcement 40.

Further, as the concrete position of the lower edge portion 40D of the hinge reinforcement 40, this lower edge portion 40D is set so as to be at a position that is to the lower edge portion 39B1 of the lower hinge mounting seat 39 of the pillar outer panel 36. In order to ensure a seat surface 39A for mounting the lower hinge 48 (see FIG. 5), the lower hinge mounting seat 39 is made into a shape that projects from a surface 36A4 of the vertical wall portion 36A1.

Therefore, an inclined wall 39B is provided between the seat surface 39A and the surface 36A4 of the vertical wall portion 36A1, and the lower hinge mounting seat 39 is in a reinforced state. In other words, the periphery of the lower hinge mounting seat 39 is made to be a so-called weak portion 66, and the rigidity and strength thereof are lower than those of the lower hinge mounting seat 39. Note that the lower hinge mounting seat 51 that is provided at the reinforcement lower 46 is substantially similar to the lower hinge mounting seat 39.

The weak portion 66 is set such that, at the time of a vehicle side collision, impact energy is absorbed due to the center pillar 18 bending with this weak portion 66 being the starting point. Accordingly, by setting the lower edge portion 40D of the hinge reinforcement 40 to the position of the lower edge portion 39B1 of this inclined wall 39B and setting the lower edge portion 40D to be further toward the upper side than this weak portion 66, it can be made such that the lower edge portion 40D does not impede deformation of the center pillar 18 at the time of a vehicle side collision. Namely, in the present embodiment, at the time of a vehicle side collision, the center pillar 18 can be deformed at a predetermined position.

Further, in the present embodiment, the joined portion 56 is disposed between the upper hinge mounting portion 50 and the lower hinge mounting portion 52 that are for supporting the rear side door 27 so as to be able to open and close. Due thereto, as shown in FIG. 4, this joined portion 56 is, at the vehicle transverse direction inner side, directly reinforced by the hinge reinforcement 40, and, at the vehicle transverse direction outer side, indirectly reinforced by the rear side door 27 that includes the door hinges. The upper hinge (not illustrated) and the lower hinge 48 (see FIG. 5) are mounted respectively to the upper hinge mounting portion 50 and the lower hinge mounting portion 52, and the regions around the door hinges including the door hinges are reinforced.

Therefore, the joined portion 56 is reinforced due to the joined portion 56 being disposed between the upper hinge mounting portion 50 and the lower hinge mounting portion 52. Accordingly, due to the joined portion 56 being disposed between the upper hinge mounting portion 50 and the lower hinge mounting portion 52, this joined portion 56 is reinforced doubly by the hinge reinforcement 40 and by the side door 27 including the upper and lower door hinges.

Moreover, in the present embodiment, as shown in FIG. 2, the cut-out 64 is formed in the lower end portion of the hinge reinforcement 40. Therefore, at the lower end portion of the hinge reinforcement 40, the strength and rigidity are lower than those at the other portions of the hinge reinforcement 40. Due thereto, it is made such that the hinge reinforcement 40 does not impede deformation of the center pillar 18. Namely, by lowering the strength and rigidity in a stepwise manner in the order of the weak portion 66 of the reinforcement lower 46 and the lower end portion of the hinge reinforcement 40, at the time of a vehicle side collision, the center pillar 18 is deformed in a stepwise manner at the lower portion side of the center pillar 18, and the impact energy can be absorbed more effectively.

Namely, at the hinge reinforcement 40, the position that faces the joined portion 56 bears the strength and rigidity for reinforcing the joined portion 56, and the strength and rigidity at the vehicle vertical direction lower side of this position that faces the joined portion 56 can be decreased. Accordingly, contradictory performances can be achieved at the center pillar 18 owing to this hinge reinforcement 40.

(Other Embodiments)

In the present embodiment, as shown in FIG. 1, the pillar outer reinforcement 38 is divided in two vertically, but the pillar outer reinforcement 38 may be divided in three or more. In this case, plural joined portions are provided, and the hinge reinforcement 40 is disposed at the inner side of the pillar outer reinforcement 38 so as to span over these joined portions. In this way, in a case in which plural joined portions are provided, a joined portion that is further upward than the joined portion 56 does not necessarily have to be disposed between the upper hinge mounting portion 50 and the lower hinge mounting portion 52.

Further, in the present embodiment, the reinforcement upper 44 and the reinforcement lower 46 are respectively formed by steel plates of the same plate thickness, but the present invention is not limited to this. For example, the reinforcement upper 44 and the reinforcement lower 46 respectively may be formed of different materials, and/or the plate thicknesses thereof may differ.

Moreover, in the present embodiment, the lower edge portion 40D of the hinge reinforcement 40 is set so as to be at a position that is to the lower edge portion 39B1 of the lower hinge mounting seat 39 of the pillar outer panel 36. However, it is fine for the hinge reinforcement 40 to not span over the weak portion 66 that is set in advance at the center pillar 18. Accordingly, the position of the lower edge portion 40D of the hinge reinforcement 40 differs in accordance with the shape of the center pillar 18 and the type of the vehicle.

Still further, in the present embodiment, the cut-out 64 is formed in the lower end portion of the hinge reinforcement 40, but a hole portion (not shown) may be formed instead of the cut-out 64.

Further, although the center pillar 18 is described in the present embodiment, the present invention can, of course, be applied as well to the center pillar 18 and the rear pillar 20 that are shown in FIG. 6.

Although an embodiment of the present invention has been described above, the present invention is not limited to the above and can, of course, be implemented by being modified in various ways other than the above within a scope that does not depart from the gist thereof The disclosure of Japanese Patent Application No. 2013-265965 filed Dec. 24, 2013 is incorporated herein by reference in its entirety.

All publications, patent applications, and technical standards mentioned in this specification are herein incorporated by reference to the same extent as if each individual publication, patent application or technical standard was specifically and individually indicated to be incorporated by reference.

The invention claimed is:

1. A vehicle side portion structure comprising:
   a pillar outer panel that is disposed at a vehicle transverse direction outer side at a pillar that extends along a vehicle vertical direction, the pillar outer panel including an upper hinge mounting portion and a lower hinge mounting portion for supporting a side door provided at a vehicle side portion, such that the side door can open and close;
   a pillar outer reinforcement that is disposed at a vehicle transverse direction inner side of the pillar outer panel, and that is divided along the vehicle vertical direction, and at which is provided a joined portion at which divisional panel members are joined so as to be superposed one on another; and
   a reinforcing member that is disposed at a vehicle transverse direction inner side of the pillar outer reinforcement, and that is joined to the pillar outer reinforcement so as to span over the joined portion, wherein the pillar outer panel comprising a weak portion that is formed at a lower side of the lower hinge mounting portion and is set to have lower rigidity than other portions of the pillar outer panel, wherein a lower edge portion of the reinforcing member is set so as to be further toward a vehicle vertical direction upper side than the weak portion.

2. The vehicle side portion structure of claim 1, wherein a position of the lower edge portion in the vehicle vertical direction of the reinforcing member is set so as to be at a vehicle vertical direction upper side of a rocker that extends along a vehicle longitudinal direction at a vehicle transverse direction outer side of a vehicle lower portion.

3. The vehicle side portion structure of claim 1, wherein the joined portion is provided between the upper hinge mounting portion and the lower hinge mounting portion.

4. The vehicle side portion structure of claim 1, wherein a cut-out or a hole portion is formed in the reinforcing member, further toward a vehicle vertical direction lower side than a position facing the joined portion.

\* \* \* \* \*